Patented July 7, 1953

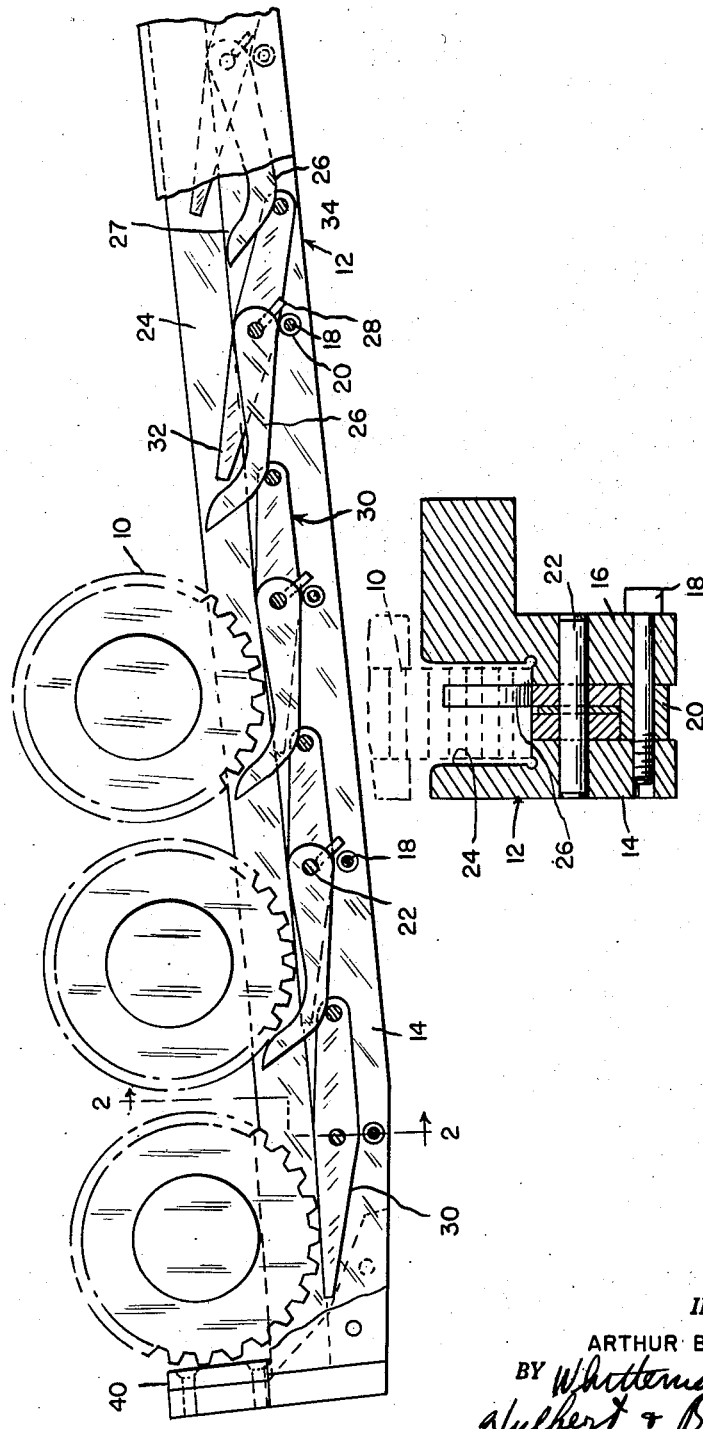

2,644,564

UNITED STATES PATENT OFFICE 2,644,564

FEED CHUTE

Arthur Bassoff, Detroit, Mich., assignor to National Broach & Machine Company, Detroit, Mich., a corporation of Michigan Application July 2, 1951, Serial No. 234,893

5 Claims. (Cl. 193—40)

The present invention relates to a feed chute. The feed chute of the present invention was designed primarily for use with automatic gear finishing machines but as will be apparent, it may be employed with machines of widely different types.

It is an object of the present invention to provide an inclined feed chute down which a series of articles are designed to roll by gravity. In the case of finished gears it is important to prevent each succeeding gear from striking the preceding gear as it rolls down the chute.

Accordingly, it is an object of the present invention to provide a feed chute in combination with independent means for arresting the advance of articles as they advance down the chute.

It is a further object of the present invention to provide a chute comprising a plurality of stop fingers in conjunction with a plurality of actuating levers, the actuating levers being positioned relative to the stop fingers so as to be depressed by a gear arrested by any particular stop finger and to have a portion designed to elevate the next preceding stop finger into operating position.

Other objects and features of the invention will become apparent as the description proceeds, especially when taken in conjunction with the accompanying drawings, wherein:

Figure 1 is a fragmentary side elevation of a chute constructed in accordance with the present invention, with parts broken away for clarity.

Figure 2 is an enlarged section on the line 2—2, Figure 1.

The feed chute illustrated herein is designed to advance a series of gears 10 and to prevent interengagement between the gears as they roll down the chute. The chute is designated in its entirety by the reference numeral 12 and comprises side plates 14 and 16 interconnected by bolts 18 and held apart by spacers 20. At predetermined intervals along the chute there are provided pivot pins 22.

The side plates 14 and 16 are shaped so as to define therebetween a channel 24 in which the gears 10 advance. Obviously, the shape of the chute will be modified in accordance with the articles designed to roll down the chute.

On each of the pivot pins 22 (with the exception of the pin nearest the discharge end) there is mounted a stop finger 26 having a stop portion 27 adapted to be projected upwardly into the path of movement of the gear 10 so as to arrest downward rolling movement thereover. The stop fingers 26 are pivoted to the pins 22 adjacent one end thereof with the result that the stop fingers 26 are biased by gravity toward a retracted or inoperative position. The stop fingers 26 are provided with abutment pins 28 which are adapted to engage spacers 20 so as to limit clockwise rotation of the stop fingers. Otherwise the stop fingers might be thrown completely over the pivot pins 22.

Mounted on the pivot pins 22 at the sides of the stop fingers 26 are actuating levers indicated generally at 30. The actuating levers 30 are unbalanced and normally tend to rock to a clockwise position in which the downhill end 32 projects upwardly into the path of advance of the gears 10. This is accomplished ordinarily by making the levers 30 with the right hand ends thereof as seen in Figure 1, of more weight than the left hand end. The actuating levers 30 include pins 34 adapted to underlie the free ends of the stop fingers 26. The arrangement is such that when a gear or other part is arrested over the downhill end of the actuating lever 30, the uphill end thereof is elevated, thereby forcing the preceding stop finger into operating position.

When the chute is empty the stop fingers and actuating levers assume the position shown at the extreme right of Figure 1. As a gear or other part advances and rolls down the chute it successively engages the downhill ends 32 of the actuating levers 30 and as it does so it elevates the preceding stop finger into operating position. However, as the gear rolls on beyond each actuating lever, the preceding stop finger again drops to its inoperative position shown at the right of the figure. At the lower end of the chute a suitable bumper 40 is provided which arrests the first gear in the chute in a position overlying the downhill end of the final actuating lever 30. This has the result of raising the next adjacent stop finger 26 to operative position and holding it in such position until the second gear comes to rest against the stop finger. The second gear at this time rests over the downhill end of the second actuating lever 30, thus setting the preceding stop finger 26 into operative position.

When the gear at the left of the chute shown in Figure 1, is removed, the preceding stop finger drops to inoperative position and the second gear from the left rolls up against the abutment 40. As the second gear rolls off of the downhill end of the second actuating lever 30, this releases the stop finger holding the third gear in position.

Accordingly, the whole sequence of gears move downwardly one space in a controlled action.

The device operates to arrest the gears while preventing the teeth thereof from damaging the finished surfaces of the teeth of the preceding gear. At the same time, while the invention has been illustrated in conjunction with gears it will of course be appreciated that it has a much wider field of application and might be used for example, in controlling downward movement of fragile articles such as glass, in gravity chutes.

The drawings and the foregoing specification constitute a description of the improved feed chute in such full, clear, concise and exact terms as to enable any person skilled in the art to practice the invention, the scope of which is indicated by the appended claims.

What I claim as my invention is:

1. An inclined chute for the gravity advance of articles such as gears or the like which might be injured if allowed to engage each other, a series of stop fingers extending longitudinally of said chute and pivoted thereto adjacent their upper ends, said fingers having article engaging stop portions adjacent the lower ends thereof, said fingers being biased by gravity to a position in which said stop portions are below stop position, a series of actuating levers extending longitudinally of said chute and pivoted intermediate their ends to said chute and having their lower ends movable between a raised position in which they are engaged by an article moving along said chute and an actuating position in which the said lower ends of said levers are depressed by an article and the upper ends of said levers are raised, abutment means at the upper ends of said levers and the lower ends of said fingers, said fingers each operating through said abutment means to raise the lower end of the associated lever when no article is engaging each stop finger, and each lever operating through said abutment means to raise the stop portion of its associated stop finger when an article engages the lower end of such lever.

2. Structure as defined in claim 1 in which the lower end of each lever is directly adjacent the stop portion of a stop finger and the abutment means at the upper end of each lever is engageable with abutment means on the next preceding stop finger in the series.

3. Structure as defined in claim 3 in which a single pivot member is provided for mounting both a stop finger and a lever thereon.

4. An inclined chute for the gravity advance of articles such as gears or the like which might be injured if allowed to engage each other, transverse pivot pins on said chute, a pivoted stop finger and actuating lever on the intermediate ones of said pins, said stop fingers being pivoted at one end and biased by gravity to an inoperative position, said actuating levers being pivoted intermediate their ends and having one end in position to be depressed by an article and the other end elevated, and means on the said other end to elevate the preceding finger into operative position.

5. A chute as defined in claim 4 in which said stop fingers are provided with abutments thereon, and fixed stop elements engageable thereby to limit the amount by which said fingers can be elevated.

ARTHUR BASSOFF.

References Cited in the file of this patent
UNITED STATES PATENTS

| Number | Name | Date |
|---|---|---|
| 842,601 | Woodson et al. | Jan. 29, 1907 |
| 1,044,682 | Melchert | Nov. 19, 1912 |
| 1,819,032 | Lehman | Aug. 18, 1931 |
| 1,841,926 | Zuehl | Jan. 19, 1932 |
| 1,852,827 | Smith | Apr. 5, 1932 |